US012711935B2

(12) United States Patent
Cox et al.

(10) Patent No.: US 12,711,935 B2
(45) Date of Patent: Aug. 18, 2026

(54) ACOUSTIC ISOLATION DEVICE COVER

(71) Applicant: Hatchmed Corporation, Seattle, WA (US)

(72) Inventors: Carl Cox, Kailua, HI (US); Jacob Glickstein, Seattle, WA (US); Kyrylo Keydanskyy, Seattle, WA (US); Brian Hatch, Seattle, WA (US)

(73) Assignee: Hatchmed Corporation, Seattle, WA (US)

( * ) Notice: Subject to any disclaimer, the term of this patent is extended or adjusted under 35 U.S.C. 154(b) by 228 days.

(21) Appl. No.: 18/615,092

(22) Filed: Mar. 25, 2024

(65) Prior Publication Data

US 2025/0299661 A1 Sep. 25, 2025

(51) Int. Cl.
*G10K 11/162* (2006.01)
*H04R 1/02* (2006.01)
*H04R 1/08* (2006.01)

(52) U.S. Cl.
CPC ........... *G10K 11/162* (2013.01); *H04R 1/023* (2013.01); *H04R 1/086* (2013.01)

(58) Field of Classification Search
CPC ....... G10K 11/162; H04R 1/023; H04R 1/086
See application file for complete search history.

(56) References Cited

U.S. PATENT DOCUMENTS 5,418,521 A * 5/1995 Read .................. G08B 13/1409 340/687
6,188,773 B1 * 2/2001 Murata .................... H04R 1/44 381/361
6,462,668 B1 * 10/2002 Foseide .............. G08B 13/1418 340/687
2010/0119461 A1 * 5/2010 Bicard-Benhamou ....................... A61Q 19/008 424/59
2014/0013503 A1 * 1/2014 Dixon .................. A61G 7/1065 5/85.1
2014/0268519 A1 * 9/2014 Huang ................. H04B 1/3888 361/679.01
2019/0341958 A1 11/2019 Coverstone
2021/0251095 A1 * 8/2021 Fukushima ............. H04M 1/02
2023/0052402 A1 * 2/2023 Choi .................... H05K 5/0217
2023/0279589 A1 * 9/2023 Wu .......................... D04C 1/02 87/8

(Continued)

FOREIGN PATENT DOCUMENTS

KR 200472418 Y1 4/2014

*Primary Examiner* — Forrest M Phillips
(74) *Attorney, Agent, or Firm* — Kilpatrick Townsend & Stockton LLP

(57) ABSTRACT

A device case including a first portion. The device case including a second portion opposite of the first portion, the first portion and the second portion defining a first space for a device such that the device case encases the device when the device is installed in the first space. The device case including a set of perforations through the device case and corresponding to a location of an audio interface of the device in the first space, the audio interface including at least one of a microphone or a speaker. The device case including an acoustic isolation barrier positioned between the first portion and the second portion, the acoustic isolation barrier defining a second space such that the audio interface is located in the second space when the device is installed in the first space.

27 Claims, 9 Drawing Sheets

(56) References Cited

U.S. PATENT DOCUMENTS

| | | | | |
|---|---|---|---|---|
| 2023/0293026 | A1* | 9/2023 | Loh | A61B 5/0261<br>600/480 |
| 2024/0073619 | A1* | 2/2024 | Liu | H04R 1/025 |

* cited by examiner

ACOUSTIC ISOLATION DEVICE COVER

BACKGROUND

A device cover may be used to protect a device. The device cover tends to protect the device from external forces such as drops. However, the device cover may interfere with the capability of a device to receive input or, in certain situations, may degrade the quality of the input to an audio interface of the device. The device cover may additionally interfere with the capability of the device to transmit audio output.

DETAILED DESCRIPTION OF THE INVENTION

Figure 1:
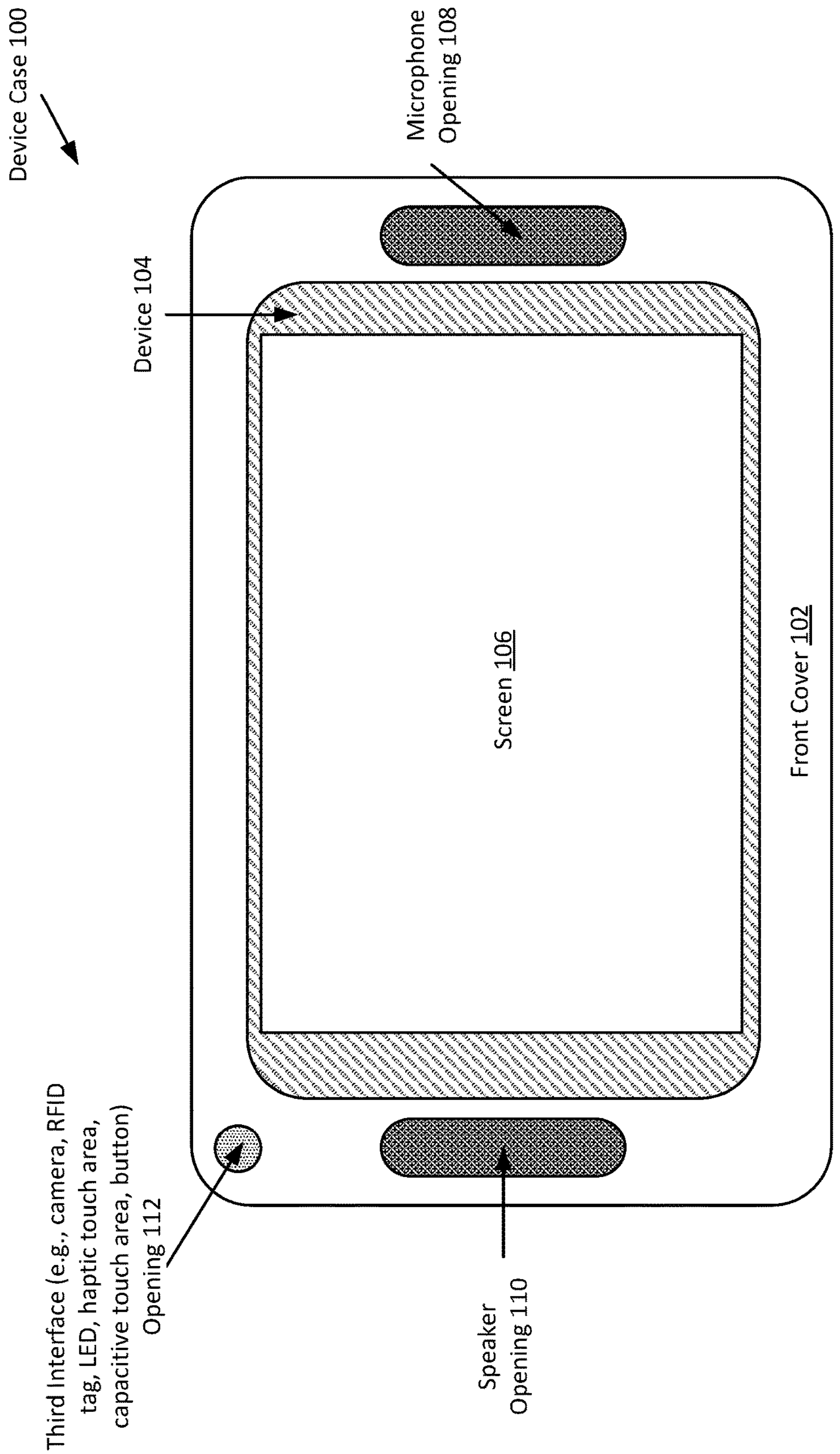
FIG. 1 illustrates an example of a device case viewed from the front and encasing an installed device, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to techniques for using one or more acoustic isolation barriers to restrict the propagation of audio (e.g., sound, acoustic waves, audio waves) within a device cover. The techniques described further relate to protecting audio interfaces. An audio interface may be a type of interface (e.g., a user interface). The user interface may receive input from one or more users and/or present output to one or more users. An example of a user interface may be a microphone and/or speaker. A microphone may be an example of an input interface and a speaker may be an example of an output interface.

A cover for a device, such as a mobile device is often configured to protect the device from being damaged upon an impact occurring (e.g., drop, fall, hit, etc.). Generally, the cover includes a rigid housing. In some cases, the cover may cause an interface of the device to be encased in the housing and therefore the output from the interface (e.g., speaker) may be picked up by another interface (e.g., microphone interface, due to vibration, resonance, and/or acoustic signal travel in the housing, etc. In some cases, one or more openings are included in the device case so that sound can travel through the one or more openings. The one or more openings may facilitate sound traveling from an interface inside of the device case to the outside of the device case or from the outside of the device case to an interface on the inside of the device case. However, such a configuration may lack protections for the interface. One way to enhance protection of the interface while preventing audio output from the a first interface from interfering with the audio input to a second interface (e.g. the microphone erroneously detecting the speaker audio output as user input) is to enclose the first interface and the second interface in the device housing while configuring the device housing to prevent audio output of the speaker from traveling to the microphone.

Certain embodiments include a device case including a first portion, a second portion opposite of the first portion, a set of perforations, and an acoustic isolation barrier. The first portion and the second portion may define a first space for a device such that the device case encases the device when the device is installed in the first space. The set of perforations may extend through the device case and corresponding to a location of an audio interface of the device in the first space, the audio interface including at least one of a microphone or a speaker. The acoustic isolation barrier may be positioned between the first portion and the second portion, the acoustic isolation barrier defining a second space such that the audio interface is located in the second space when the device is installed in the first space.

The device case may include a kickstand coupled to the device case and including a first perforation for a cable that feeds through a second perforation of the device case. The device case may include a clip coupled to the device case and including cylindrical arms and a torsion spring configuring the cylindrical arms of the clip to wrap around an object.

Certain embodiments include a system comprising a device and a device case. The device case may include a first portion, a second portion opposite of the first portion, a set of perforations, and an acoustic isolation barrier. The first portion and the second portion may define a first space for a device such that the device case encases the device when the device is installed in the first space. The set of perforations may extend through the device case and corresponding to a location of an audio interface of the device in the first space, the audio interface including at least one of a microphone or a speaker. The acoustic isolation barrier may be positioned between the first portion and the second portion, the acoustic isolation barrier defining a second space such that the audio interface is located in the second space when the device is installed in the first space.

Certain embodiments include a method. The method may include providing a device case including a set of perforations through the device case, a first portion, and a second portion opposite of the first portion configured to define a first space for a device such that the device case encases the device when the device is installed in the first space, wherein the device case includes an acoustic isolation barrier between the first portion and the second portion, the acoustic isolation barrier defining a second space. The method may further include installing the device that includes an audio interface between the first portion and the second portion at a location such that the audio interface corresponds to the set of perforations and is located in the second space, wherein the audio interface includes at least one of a microphone or a speaker. The method may further include mating the first portion with the second portion to define the first space. Installing the device may further include placing the device against one or more device risers configured to raise the device toward the first portion cover and away from the second portion, wherein at least one of the one or more device risers includes the acoustic isolation barrier.

Techniques described herein may provide systems, methods, devices, etc. for configuring a device cover. The device cover may be configured to protect a device. The device cover may be configured to enable the user of the device to interact with interfaces of the device, such as hear output from a speaker interface of the device and cause input to be received by a microphone interface of the device. The device cover may protect the device and/or one or more interfaces from impacts and/or environmental hazards, such as dust and liquid. The device cover may further prevent output from a first interface (e.g., the speaker interface) from being received by a second interface (e.g., the microphone interface). Further, the device case may be configured to include a kickstand and/or clip that enables the device case to be positioned according to a user preference.

FIG. 1 illustrates an example of a device case 100 viewed from the front and encasing an installed device, according to embodiments of the present disclosure.

The device 104 case may include a front cover 102, a back cover 202 that is not shown from the viewpoint illustrated in FIG. 1 (the back cover is discussed in more detail below (e.g., with respect to FIG. 2)), a speaker opening 110, a microphone opening 108, and a third interface opening 112. A device 104 may be installed in a first space defined by the device case 100. The device 104 may include a screen 106 which may be viewed, partially or completely, from the front of the front cover 102 (e.g., the front cover 102 may form an opening that the screen can be viewed through.

The device case 100 may be configured specifically for the device 104 or another device from a set of devices to be installed in the device case 100. For example, the device case 100 may be capable of having the device 104 installed in the device case 100 and may be capable of having other similar sized devices installed in the device case 100.

The device 104 may be a user device such as a laptop, personal computer, phone, tablet, etc. The device 104 may be any device that can be installed in the first space defined by the device case 100. The device 104 may include any number of interfaces. The interfaces may be user interfaces and/or data interfaces. A user interface may be an audio interface (e.g., a speaker, a microphone), a camera, a fingerprint scanner, etc. A data interface may be a lighting port, a universal serial bus (USB) port, a headphone jack, etc. In certain embodiments, the device 104 includes a speaker and a microphone.

In certain embodiments, when the device 104 is installed in the first space, an interface of the device 104 may be located in a second space. The second space may be defined by an acoustic isolation barrier (described below).

The front cover 102 may be coupled with the back cover. The front cover 102 may be coupled with the back cover 202 via one or more coupling elements. The front cover 102 may include plastic, silicon, leather, metal, wood, and/or rubber. The front cover may include any number (e.g., zero or more) of male pieces to be coupled with respective receivers (e.g., of the back cover) included in the back cover. The front cover 102 may include any number (e.g., zero or more) receiver pieces to be coupled with respective male pieces included in the back cover.

The front cover 102 may include one or more openings. The openings may also be referred to as vias or perforations. The openings may enable one or more portions of the device 104 to be viewed by a user and/or accessed by a user. The openings may enable one or more interfaces of the device 104 to be accessed by a user. The openings may enable audio to travel from outside of the device case 100 to the inside of the device case 100. The openings may enable audio to travel from inside the device case 100 to outside of the device case 100. The openings may be included in a set of perforations. Any number (e.g., zero or more) of openings may be included in the device case 100, such as being included in the front cover 102 and/or the back cover. In certain embodiments, an opening may be configured to open and/or close. In certain embodiments, an opening may be configured to be filled and/or unfilled.

An opening may correspond to a location of an interface of the device 104 that is installed in the first space and/or a location of an interface located in the second space. The opening may correspond to the location of the interface of the device 104 when an amount of empty volume 502 is between the opening and the interface. For example, there may be a path existing between the opening and the interface that is not obstructed by physical material. The opening may correspond to the location of the interface of the device 104 when an amount of substantially empty volume 502 is between the opening and the interface. For example, there may be a path existing between the opening and the interface that is not obstructed by a total amount of physical material thicker than 5 millimeters thick.

In an example, one or more openings may be located at or near where a speaker of the device 104 may be located when the device 104 is installed in the first space between the back cover and the front cover 102. The opening corresponding to the location of the interface may enable audio and/or other input to the interface to travel from the outside of the device case 100 to the inside of the device case 100. The opening at the location of the interface may enable audio and/or other output from the interface to travel from the inside of the device case 100 to the outside of the device case 100.

The device case 100 (e.g., the front cover 102 or the back cover) may include one or more membranes. An opening may correspond to a location where a membrane is located. The opening may be within a predefined distance to a membrane. The membrane may be liquid (e.g., water) impermeable and may be acoustically permeable. The membrane may act as a liquid barrier. The membrane may include polytetrafluoroethylene (PTFE) and/or expanded PTFE (ePTFE).

An opening may be the speaker opening 110. The speaker opening 110 may be an opening corresponding to an actual or planned location of a speaker of the device 104. The speaker opening 110 may be an opening included in the front cover 102.

An opening may be the microphone opening 108. The microphone opening 108 may be an opening corresponding to an actual or planned location of a microphone of the device 104. The microphone interface opening 108 may be an opening included in the front cover 102.

An opening may be the third interface opening 112. The third interface opening 112 may be an opening corresponding to an actual or planned location of a third interface of the device 104 (e.g., a camera, a fingerprint sensor, etc.). The third interface opening 112 may be an opening included in the front cover 102.

Although the illustrated front cover 102 of the device case 100 includes three interface openings, the device case 100 may include any number (e.g., zero or more) of interface openings.

In certain embodiments, the front cover 102 may include a first portion and/or a second portion. In certain embodiments, the back cover 202 may include a first portion and/or a second portion. Although the described device 104 case includes a front cover 102 and a back cover 202, in certain embodiments, the device 104 case may include one or more unitary pieces. In certain embodiments, the device case 100 may be airtight and/or waterproof. In certain embodiments, the device case 100 is waterproof up to a certain depth/pressure.

Figure 2:
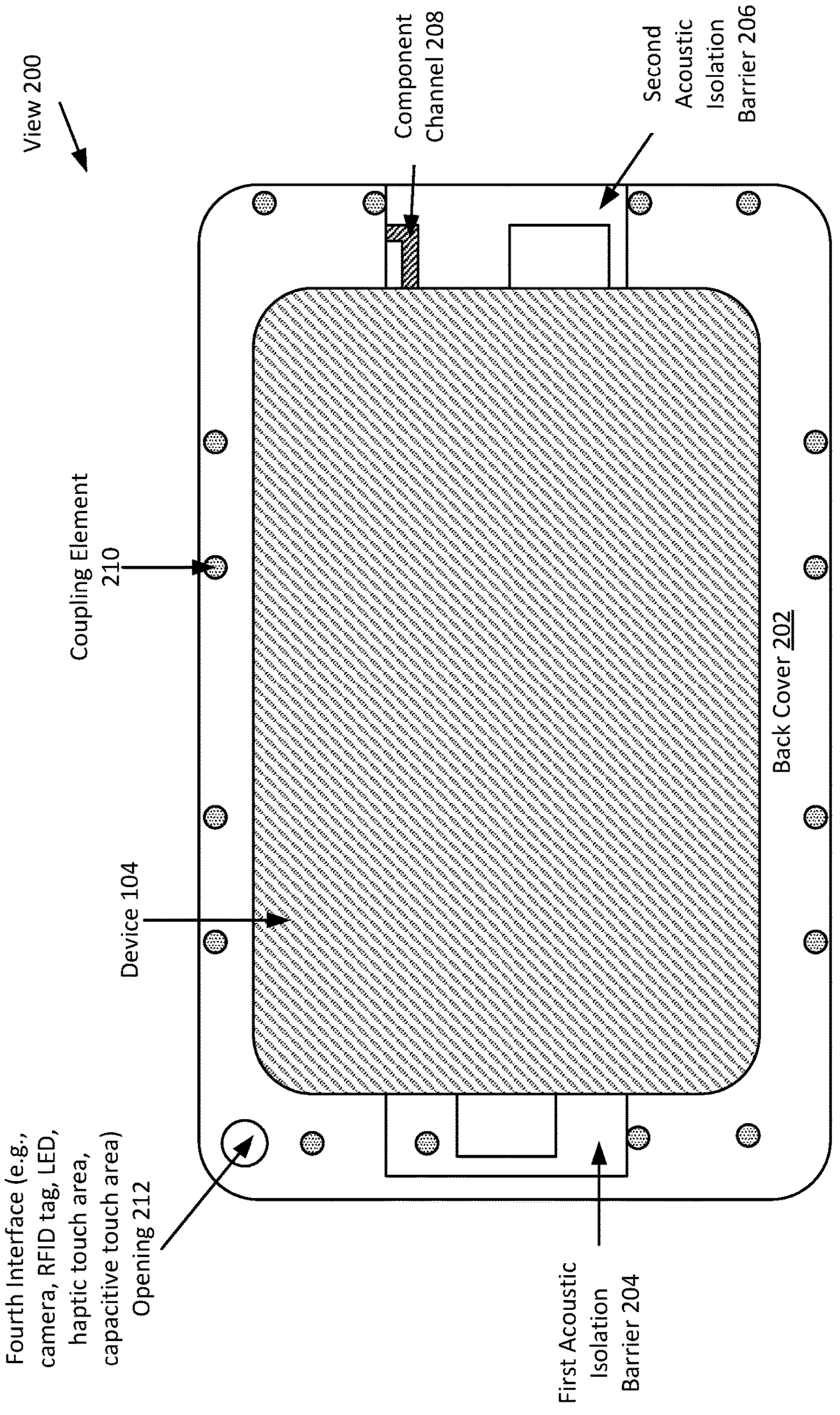
FIG. 2 illustrates an example of a back cover of a device case viewed from the front and with a device installed, according to embodiments of the present disclosure.

FIG. 2 illustrates an example of a back cover 202 of a device case 100 viewed from the front and with a device 104 installed, according to embodiments of the present disclosure. The back cover 202 may be the back cover of the device case 100 illustrated in FIG. 1, but not seen from the viewing perspective illustrated in FIG. 1.

The illustrated view 200 may be from the same perspective that the device case 100 in FIG. 1 was viewed from. The view 200 illustrates the device case 100 without the front cover 102.

The view 200 of the device case 100 illustrates that the device case 100 may include a back cover 202, a first acoustic isolation barrier 204, a second acoustic isolation barrier 206, a component channel 208, a coupling element 210, a device 104, and a fourth interface opening 212.

The back cover 202 may be configured to couple with the front cover 102. Coupling the back cover 202 with the front cover 102 may define a first space for the device 104 such that the device case 100 encases the device 104 when the device 104 is installed in the first space. The back cover 202 may be made from any combination of material that the front cover 102 may be made from.

The back cover 202 may include one or more openings. The openings may be similar to the openings described above with respect to FIG. 1. The one or more openings included in the back cover 202 may correspond to a location of an interface of the device 104. For example, an opening may correspond to the location where an audio of the device 104 is located when the device 104 is installed in the first space. The one or more openings included in the back cover 202 may correspond to a location of an interface of the device case 100. For example, the device case 100 may include any number of integrated interfaces such as a speaker or light element (e.g., light emitting diode (LED)) and an opening may correspond to the integrated interface location.

The integrated interface may be an interface that is included in the device case 100. For example, the device case 100 may include one or more lights, haptic touch areas, capacitive touch areas, built in speakers, built in microphones, a transmitter (e.g., for a radio frequency identification (RFID), for a real time location system (RTLS)), a receiver (e.g., for RFID, for RTLS), a button (e.g., a nurse call button), etc. The integrated interface may be coupled to a printed circuit board (described in more detail below) included in the device case 100.

The back cover 202 may include a space where the device 104 may be installed. For example, the back cover 202 may include a first area that is the same size or larger than a second area of a back surface of the device 104. The first area may enable at least a portion of the back surface of the device 104 to be placed against the back cover 202. The first area may be capable of having any device 104 with a back surface area smaller than the first area placed against the back cover 202.

In certain embodiments, the back cover 202 may include a space where a device tray may be installed. The device tray may be configured to be removably attached to the device 104. The device tray may be capable of being removably attached to a device from a set of devices of various sizes. The device tray may enable one or more devices of various sizes to be installed in the device case 100 because the device 104 tray may be configured to be removably attached to one or more devices and the device tray may be configured to be installed in a space of the device case 100. The device tray may include plastic, silicon, leather, metal, wood, and/or rubber.

The device case 100 may include one or more acoustic isolation barriers. The one or more acoustic isolation barriers may prevent audio from traveling past the acoustic isolation barrier. The one or more acoustic isolation barriers may reduce the loudness/intensity of audio traveling past the one or more acoustic isolation barriers. The one or more acoustic isolation barriers may prevent sound having certain frequencies from propagating through the one or more acoustic isolation barriers more than other sounds with a different frequency. The acoustic isolation barriers may include plastic, silicon, leather, metal, wood, rubber, foam, and/or fabric.

The one or more acoustic isolation barriers may protrude from at least one of back cover 202 or the front cover 102 and extend to at least one of: (i) the device 104 or (ii) the other one of the back cover 202 or the front cover 102. For example, an acoustic isolation barrier may be configured such that the acoustic isolation barrier extends to a location where the acoustic isolation barrier will be in contact with a device 104 installed in the device case 100. In an example, an acoustic isolation barrier may be configured such that the acoustic isolation barrier extend from the back cover 202 to a location where the acoustic isolation barrier will be in contact with the front cover 102 when the front cover 102 and the back cover 202 are coupled.

The one or more acoustic isolation barriers may define a space such that an interface (e.g., an audio interface, integrated interface, interface of the device 104, a microphone) is located in the second space. An interface of the device 104 may be located in the second space when the device 104 is installed in the device case 100.

In certain embodiments, a single acoustic isolation barrier is included in the device case 100. The single acoustic isolation barrier may be placed between a first interface and a second interface to prevent audio from traveling from a space where the first interface is located to a space where the second interface is located.

The one or more acoustic isolation barriers may partially or completely surround the space corresponding to a location of an interface. For example, an acoustic isolation barrier may completely surround the space in which a speaker is located to reduce or prevent the audio from the speaker from traveling to the location of another interface. In an example, an acoustic isolation barrier may partially surround the space in which a speaker is located to reduce the audio from the speaker from traveling to the location of another interface (e.g., a microphone).

In certain embodiments, the acoustic isolation barrier may include one or more fastening elements 210 and/or may be a coupling element 210. The acoustic isolation barrier may be capable of being removably couplable with the front cover 102 and/or the back cover 202. In an example, an acoustic isolation barrier is included in the back cover 202 and the acoustic isolation barrier includes a coupling element 210 capable of coupling with the front cover 102 such that the back cover 202 and the front cover 102 are caused to be coupled.

In certain embodiments, at least one of the one or more acoustic isolation barriers, or other device case 100 component(s), may include antimicrobial additives. Antimicrobial additives may include isothiazolinone treatments, zinc pyrithione, thiabendazole, silver, copper, zinc, etc. The antimicrobial additives may be organic or inorganic. The antimicrobial additives may partially or completely prevent microbial growth and therefore maintain the structural integrity and/or cleanliness of the acoustic isolation barrier or other component of the device case 100. Antimicrobial additives may be particularly useful to include in the device case 100 when the device case 100 is configured to be used in a medical environment. Antimicrobial additives may be useful in various other environments to prevent the growth of microbials. Antimicrobial additives may be specifically added near the location of an interface because the interface may be placed close to a device 104 user's hand, mouth, and/or ear.

The one or more acoustic isolation barriers may correspond to the location of an opening. The one or more acoustic isolation barriers may correspond to the location of an opening because the opening may be at a location where audio may be capable of entering into and/or out of the device case 100.

In certain embodiments, one or more acoustic isolation barriers surround (e.g., partially or completely) a space such that audio is prevented (e.g., partially or completely) from entering the space from outside of the space (e.g., by dampening or limiting audio waves that travel toward the space from a source external to the space). In certain embodiments, one or more acoustic isolation barriers surround (e.g., partially or completely) the space such that audio is prevented (e.g., partially or completely) from exiting the space from inside of the space.

An example of an acoustic isolation barrier is the first acoustic isolation barrier 204. In the illustrated example, the first acoustic isolation barrier 204 may define a space such that a speaker of the device 104 is located in the space when the device 104 is installed in the device case 100. The first acoustic isolation barrier 204 may include an empty volume that is configured to enable audio to travel through the empty volume. The first acoustic isolation barrier 204 may be configured to prevent or reduce the audio that travels from the space defined by the first acoustic isolation barrier 204 to a different space (e.g., a space defined by the second acoustic isolation barrier 206). In an example, the first acoustic isolation barrier 204 prevents at least a portion of audio from traveling from a speaker of the device 104 to a microphone of the device 104. The empty volume included in the first acoustic isolation barrier may correspond to at least one opening in the front cover 102 of the device case 100 or the back cover 202 of the device case 100.

In the illustrated example, the first acoustic isolation barrier 204 may extend from the back cover 202 to at least one of the device 104, or the front cover 102 when the front cover 102 is coupled with the back cover 202.

An example of an acoustic isolation barrier is the second acoustic isolation barrier 206. In the illustrate example, the second acoustic isolation barrier 206 may define a space such that the microphone is located in the space when the device 104 is installed in the device case 100. The second acoustic isolation barrier 206 may include an empty volume that is configured to enable audio to travel through the empty volume. The second acoustic isolation barrier 206 may be configured to prevent or reduce the audio that travels from the space defined by the second acoustic isolation barrier 206 to a different space (e.g., a space defined by the first acoustic isolation barrier 204). In an example, the second acoustic isolation barrier 206 prevents at least a portion of audio from traveling from a microphone of the device 104 to a speaker of the device 104. The empty volume included in the second acoustic isolation barrier may correspond to at least one opening in the front cover 102 of the device case 100 or the back cover 202 of the device case 100.

In the illustrated example, the second acoustic isolation barrier 206 may extend from the back cover 202 to at least one of the device 104, or the front cover 102 when the front cover 102 is coupled with the back cover 202.

An acoustic isolation barrier, front cover 102, back cover 202, and/or other component of the device case 100 may include one or more component channels 208. A component channel 208 may be configured to enable one or more components to extend through the component channel 208.

The component channel 208 may include a first end and a second end. The first end of the component channel 208 may be exposed to a first side of the device 104 case. The first side of the device case 100 may be between the front cover 102 and the back cover 202 (e.g., the inside of the device case 100). The second end of the component channel 208 may be exposed to a second side of the device 104 case. The second side of the device case 100 may be exposed to an outside of the device case 100.

In certain embodiments, the component channel 208 may include more than two ends. For example, the component channel may enable a first wire to be routed from a first end of the component channel 208 to a second end of the component channel 208 and a second wire to be routed from the first end of the component channel 208 to a third end of the component channel 208.

In certain embodiments, more than one end of the component channel 208 may be exposed to the outside of the device case 100. For example, the component channel 208 may include a first end and a second end that are each exposed to the outside of the device case 100. The component channel 208 may enable a string, rope, bar, or other component that is external to the device case 100 to pass through the component channel. Such an embodiment may be useful for tethering the device case 100 to an object or area.

In certain embodiments, more than one end of the component channel 208 may be exposed to the inside of the device case 100. For example, the component channel 208 may include a first end and a second end that are each exposed to the inside of the device case 100. The component channel 208 may enable a wire to travel between components within the device case 100 (e.g., from a PCB 306 in the device case 100 to an interface of the device 104 installed in the device case 100). Such an embodiment may be useful for wire management within the device case 100, preventing components from rattling around within the device case 100, and/or controlling where heat emitted by the wire is primarily dispersed within the device case 100.

Other components that may be included in the device case 100 may be a cable, a printed circuit board (PCB), a magnet, a radio frequency identification (RFID) tag, a battery bank, a sensor, a wireless charging induction coil, etc. Embodiments that include a PCB are described below in more detail. The component channel 208 may be configured such that the cable, the PCB 306, the magnet, the RFID tag, the battery bank, the sensor, the wireless charging induction coil, or other component of the device case 100 can be located within (e.g., housed by) the component channel 208.

A magnet may be included in the device case 100 so that the device case 100 can be mounted to a surface that the magnet is attracted to (e.g., a magnetic wall). A magnet may be included in the device case 100 so that an object may be magnetically attached to the device case 100. For example, a stylus may be magnetically attached to the device case 100 so that the stylus can be held in place by the device case 100 when the stylus is not in use. The magnet may be used as a magnetic connector to facilitate the attachment of a cable to the device 104 or the device case 100. For example, the magnet may be used to hold a cable attached to the device 104 or the device case 100 in place. In certain embodiments, the cable is connected to a medical system (e.g., hospital system), device 104, or a device (e.g., medical device) not housed by the device case 100. In certain embodiments, the cable includes an interface (e.g., a button, a nurse call button, an audio interface).

An RFID tag may be included in the device case 100 so that the device case 100 location can be tracked. The RFID tag may be included to that RFID tag can be associated with the device 104 which is installed in the device case 100.

A battery bank may be included in the device case 100. The battery bank may enable the device 104 to be unplugged from another power source for a longer period of time. The battery bank may be used as a backup power source when a primary power source (e.g., from a wall outlet) terminates power transmission. The battery bank (e.g., power charger) may wirelessly (e.g., magnetically) charge the device 104.

A sensor may be included in the device case 100. The sensor may be communicatively coupled to the PCB 306 and/or the device 104. The sensor may sense the orientation of the device 104 case, the location of the device 104 case, the acceleration of the device 104 case, etc. The sensor may enable biometric measurements to be obtained (e.g., fingerprint, retina, face, etc.). For example, the measurements obtained from the biometric sensor may be used to determine which user is using the device 104, a user that is holding the device case 100, a user in a room, etc.

The sensor may include a light sensor. For example, the sensor may obtain light measurements to determine if lights in a room are on or off or if a specific color of light in the room is being embittered (e.g., a red light may be emitted in a room when an emergency occurs). Other types of sensors may be included in the device case 100.

The coupling element 210 may be one of one or more coupling elements 210. The coupling element 210. The coupling element 210 may be a male piece to be coupled with a receiver. The coupling element 210 may be a receiver piece to be coupled with a male piece.

The coupling element 210 may be a magnet to be coupled with another coupling element 210. For example, the front cover 102 may include a coupling element 210 that corresponds to the coupling element 210 of the back cover 202 such that the coupling element 210 of the front cover 102 and the coupling element 210 of the back cover 202 are coupled to cause the back cover 202 and the front cover 102 of the device case 100 to be coupled. The coupling element 210 may not be a separate component per se, but may be defined by a property of the material used for the component to be fastened. For example, the front cover 102 and the back cover 202 may be made of magnetic material and therefore the front cover 102 and the back cover 202 may be coupled via magnetic coupling.

In a device case 100 that includes more than one coupling element 210, the coupling elements may be of different types. For example, a first coupling element 210 may be a magnetic coupling element and a second coupling element 210 may be a receiver coupling element. In certain embodiments, a coupling element 210 may include a screw, a nut, glue, a bolt, clamps, wire, rivets, interlocking joints, etc.

The device 104 may be the same device 104 as described with respect to FIG. 1, above.

The fourth interface opening 212 may be an interface opening similar to the third interface opening 112. The fourth interface opening 212 may be an opening included in the back cover 202. The back cover 202 may include any number of openings.

Figure 3:
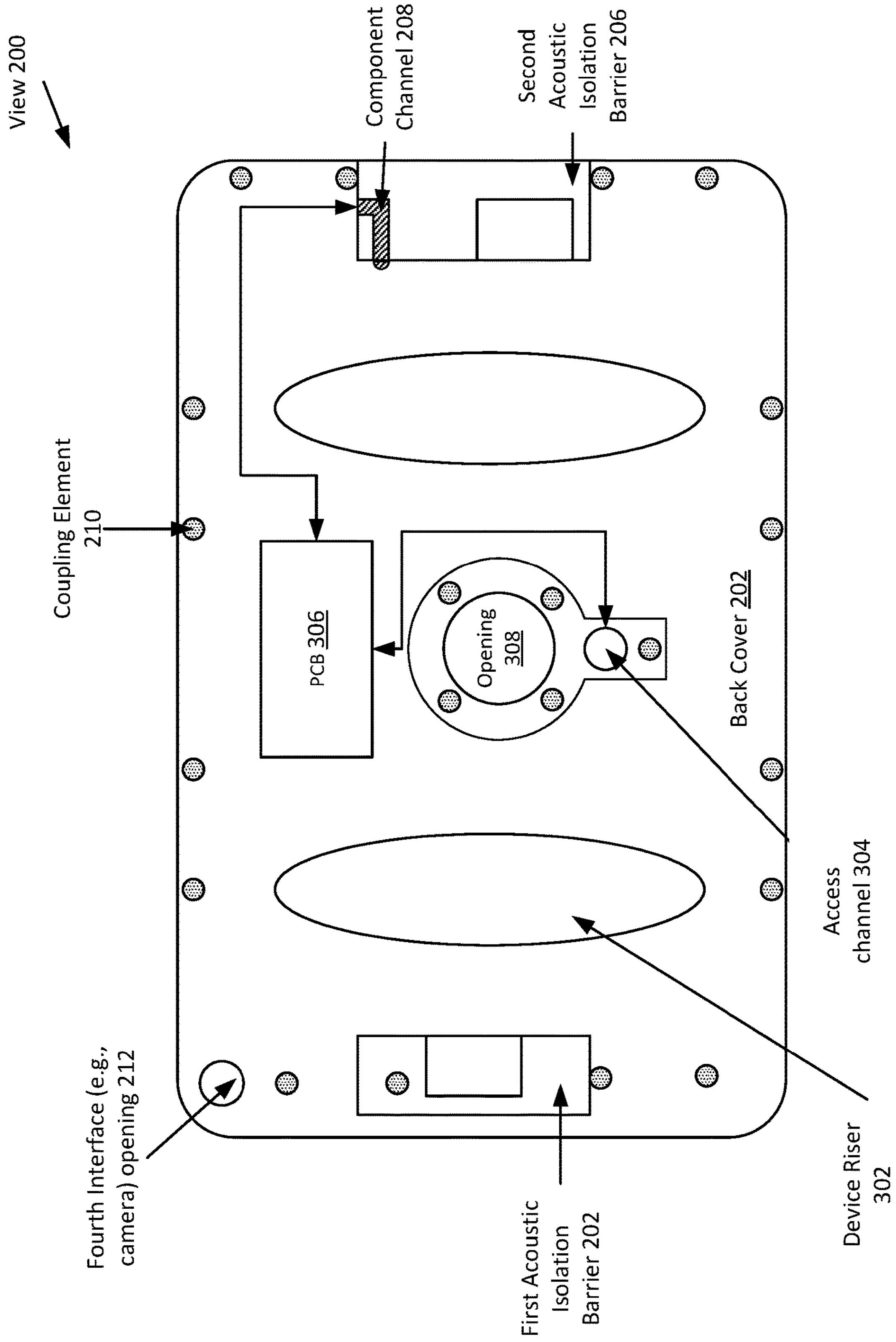
FIG. 3 illustrates a first example of a back cover of a device case viewed from the front, according to embodiments of the present disclosure.

FIG. 3 illustrates a first example of a back cover 202 of a device case 100 viewed from the front, according to embodiments of the present disclosure. The back cover 202 may be the back cover 202 illustrated in FIG. 2. The back cover 202 illustrated in FIG. 3 does not include a device 104 resting against it like the back cover 202 illustrated in FIG. 2.

As already mentioned above, the device case 100 and/or the back cover 202 may include a first acoustic isolation barrier 204, a second acoustic isolation barrier 206, a component channel 208, a fourth interface opening 212, and a coupling element 210.

The device case 100 may include a PCB 306, an access channel 304, an opening 308, and a device riser 302.

The PCB 306 may be coupled with a transmitter (e.g., RFID, RTLS, Bluetooth, etc.), a receiver (e.g., RFID, RTLS, Bluetooth, etc.), a light element, a haptic touch area, a capacitive touch area, a button, a nurse call button, the device 104, and/or another component that is external to the device case 100. The PCB 306 may transmit data to the device 104, to a nurse call system, an integrated interface, and/or to another device using wired and/or wireless techniques. The PCB 306 may receive data from the device 104, from a nurse call system, sensors (e.g., integrated into the device case 100), an integrated interface (e.g., button, microphone, etc.), and/or another device. The PCB 306 may include a processor capable of performing instructions based on received data. The instructions may cause the PCB 306 to activate a battery bank, send a nurse call signal, activate an integrated interface (e.g., cause a speaker to transmit audio), and/or receive input from an integrated interface (e.g., from a microphone), etc. The performance of the instructions may be based on the data received by the PCB 306.

The access channel 304 may be an aperture included in the device case 100. The access channel 304 may be included in the back cover 202. The access channel 304 may enable one or more components (e.g., a cable) to pass through the device case 100. The cable may be a power and/or data cable. The cable may be coupled (e.g., removably couplable) with the device 104, device case 100, or component of the device case 100 (e.g., the PCB 306). The cable may be removably attachable to the device 104 and/or the device case 100 from within the device case 100 and/or from the outside of the device case 100. For example, the device case 100 may have to be opened such that the front cover 102 is not coupled with the back cover 202 for the cable to be attached and/or removed from the device 104 and/or the device case 100. In an example, the device case 100 may be closed such that the front cover 102 is coupled with the back cover 202, and the cable may be attachable and/or removable from the device 104 and/or the device case 100. One or more access channels may be included in one or more surfaces of the device case 100.

The opening 308 may be an opening as described above. In certain embodiments, the opening allows a user to determine which device 104 or a type of the device 104 that is installed in the device case 100 (e.g., via an identifier viewed through the opening). In certain embodiments, the opening may be used to dissipate heat from the device 104.

The device riser 302 may be one of multiple device risers. The device riser 302 may be configured to raise the device 104 towards the front cover 102 and away from the back cover 202. The device riser 302 may cause a screen of the device 104 to be located near the front cover 102 and/or pressed against the front cover 102.

The device riser 302 may enable space to be present between the back cover 202 and the device 104 when the device 104 is installed in the device case 100. The space present between the back cover 202 and the device 104 may enable one or other components to be located in the space. For example, the PCB 306 may be located between an installed device 104 and the back cover 202.

In certain embodiments, the device riser 302 may be configured to be in contact with a device 104 tray that is coupled to the device 104. In certain embodiments, the device 104 tray may include a device riser 302.

In certain embodiments a device riser 302 may include an acoustic isolation barrier. For example, the acoustic isolation barrier may prevent audio from propagating from a first space to a second space and may raise the device 104 toward the front cover 102.

Figure 4:
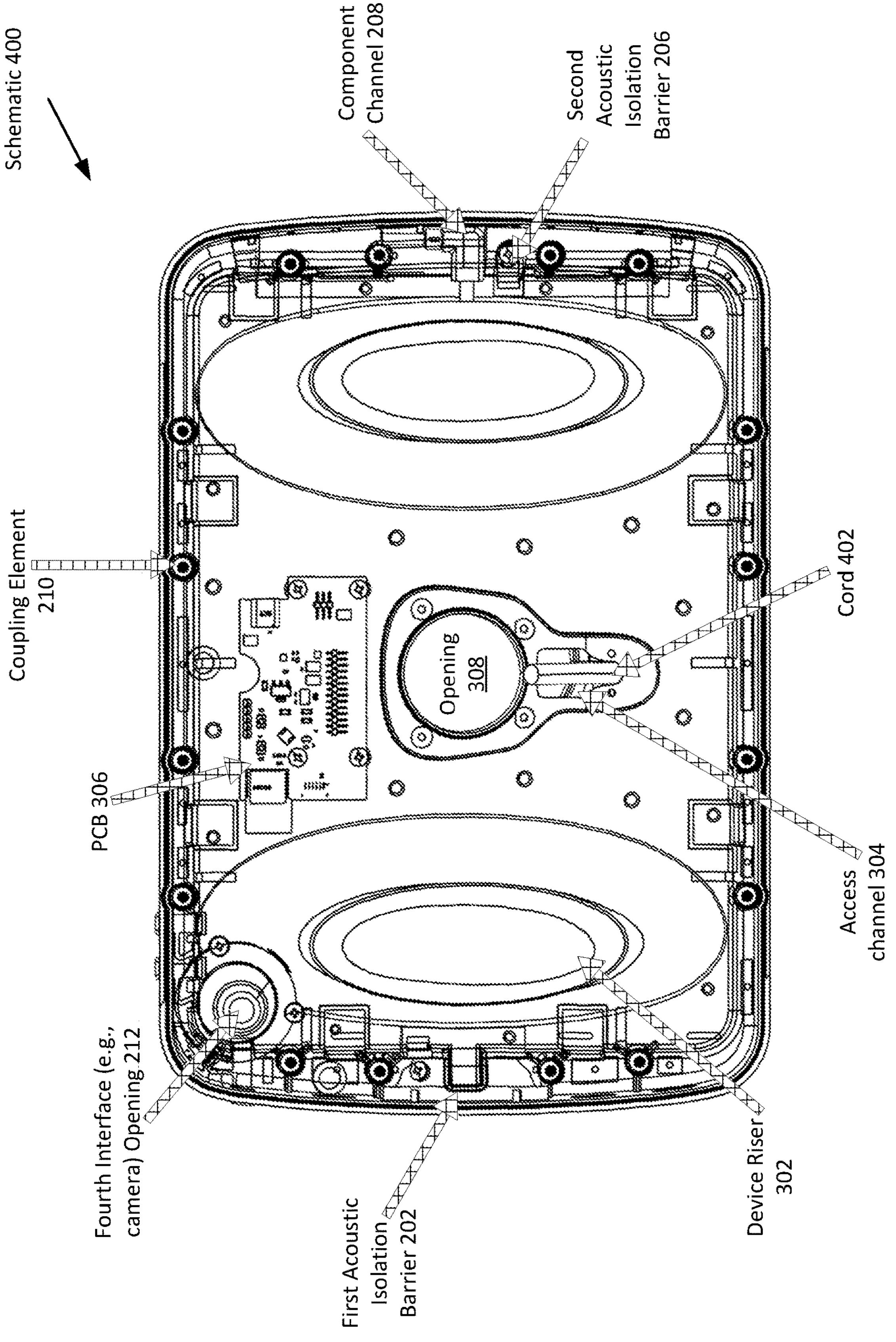
FIG. 4 illustrates a second example of a back cover of a device case viewed from the front, according to embodiments of the present disclosure.

FIG. 4 illustrates a second example of a back cover 202 of a device case 100 viewed from the front, according to embodiments of the present disclosure. The illustrated embodiments shows a schematic drawing of a portion of the device case 100 without a font cover coupled to the back cover 202. The FIG. 4 illustration is an example implementation showing additional details than what is shown in FIG. 3.

The back cover 202 may be the same back cover 202 as described with respect to FIG. 3 but may include additional illustrative details of the components that may be included in the back cover 202 and the device case 100.

The schematic 400 illustrates a cord 402 passing through the access channel 304. The cord 402 may be configured to couple to the device 104, the PCB 306, or a different component included in the device case 100.

The schematic 400 illustrates where various components of the device case 100 may be located with respect to the other components. Further illustrated is where components may be mounted to the back cover 202, how they may be mounted to the back cover 202, and the shape that the components may take.

Figure 5:
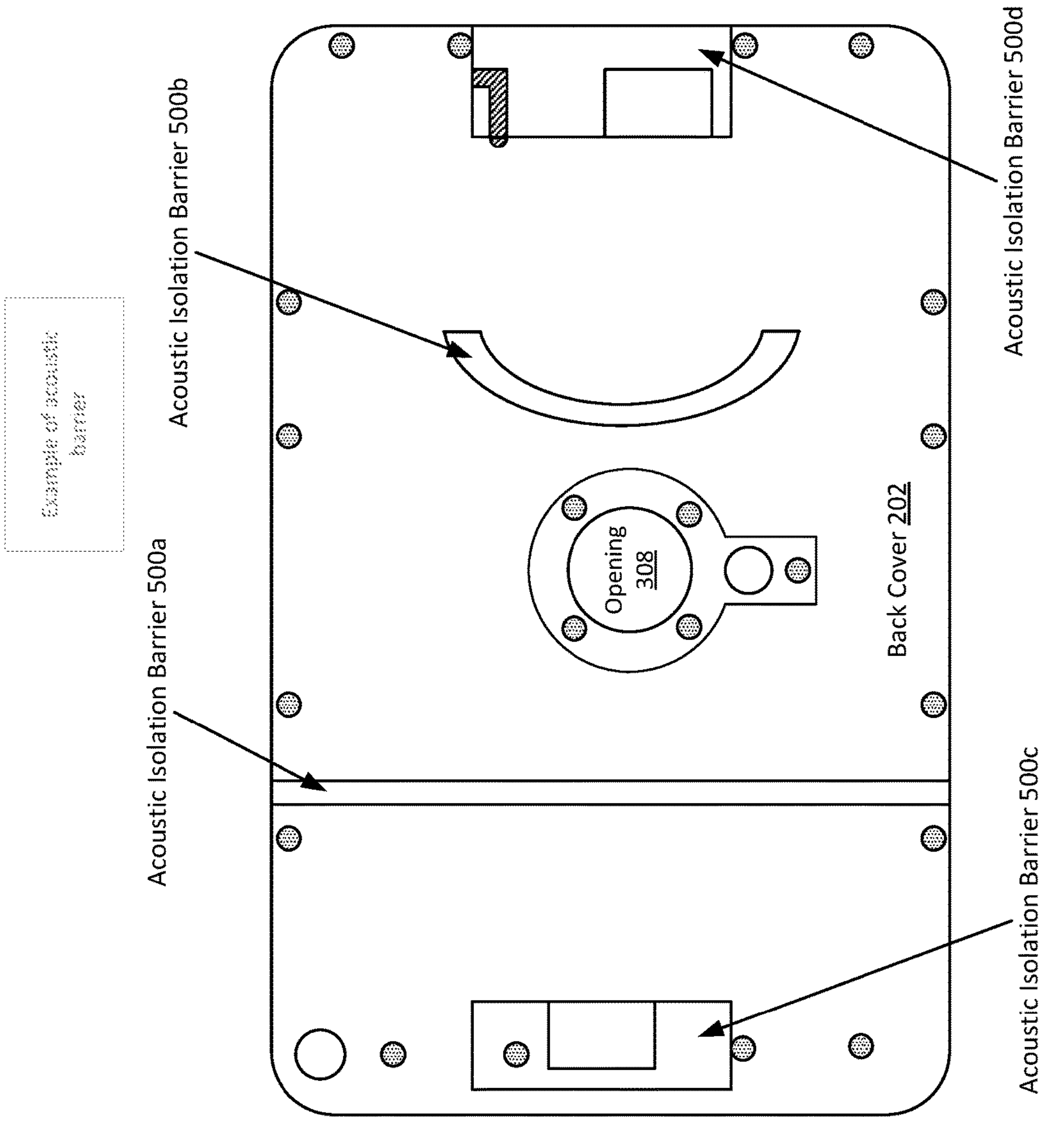
FIG. 5 illustrates multiple perspectives of an acoustic isolation barrier, according to embodiments of the present disclosure.

FIG. 5 illustrates various acoustic isolation barriers 500, according to embodiments of the present disclosure. One or more acoustic isolation barrier 500 may be included in the device case 100.

An acoustic isolation barrier 500 may include one or more sides. In a simplistic embodiment, the acoustic isolation barrier 500 may be a single planar surface that acts as a divider between two spaces. For example, the simplistic acoustic isolation barrier 500*a* may cause a first space to be divided (e.g., equally divided, unequally divided) into two smaller spaces.

The acoustic isolation barrier 500 may be placed within the device case 100. The acoustic isolation barrier 500 may be one of multiple acoustic isolation barriers 500 included in the device case 100. The acoustic isolation barrier may be coupled to the back cover 202, a front cover, and/or any other component of the device case 100. As mentioned above, the acoustic isolation barrier may include a device riser, a component channel, and/or a coupling element. In certain embodiments, the acoustic isolation barrier is included in the back cover 202, the front cover, or another component of the device case 100. For example, the acoustic isolation barrier may be formed during the molding process of the back cover 202.

The acoustic isolation barrier 500 may include any number (e.g., zero or more) rounded edges, curved surfaces, flat edges, flat surfaces, etc. The acoustic isolation barrier 500 may be a simple three dimensional shape (e.g., the rectangular acoustic isolation barrier 500*a*). The acoustic isolation barrier 500 may form a more complex shape like the shape of acoustic isolation barrier 500*d*. The acoustic isolation barrier 500 may include a width, height, and length. The width, height, and/or length of the acoustic isolation barrier 500 may enable more or less audio to be blocked by the acoustic isolation barrier 500. The width, height, and/or length of the acoustic isolation barrier 500 may be based on how much acoustic isolation the acoustic isolation barrier 500 is configured to cause. The amount of acoustic isolation may be measured in decibels. For example, the acoustic isolation barrier 500*a* may be configured to reduce a magnitude of a sound wave by 10 decibels to 50 decibels and/or may be configured to reduce a magnitude of a sound wave to be between 0 to 20 decibels.

Depending on the targeted decibel reduction and the type of material to be used, the geometry (e.g., width, height, and/or length) of the acoustic isolation barrier 500 can be defined. For example, a reduction of up to 10 decibels may be desired to be effected by acoustic isolation barrier 500*c*, and therefore the length, width, and height of the acoustic isolation barrier 500*c* may correspond to the decibel reduction, and the acoustic isolation barrier 500*c* may be made from foam. In another example where a reduction of less than 10 decibels may be desired to be caused by the acoustic isolation barrier 500*c*, the type of material may be changed and/or the length, width, and/or height may be reduced. The width, height, and/or length of the acoustic isolation barrier 500 may be based on the material(s) included in the acoustic isolation barrier 500 and/or the shape of the acoustic isolation barrier 500.

The acoustic isolation barrier 500 may reduce the amount of audio traveling from a first space to a second different space. For example, the acoustic isolation barrier 500*a* may reduce the audio traveling from a left side of the device case 100 to a right side of the device case 100. In such an embodiment the acoustic isolation barrier 500*a* may reduce the audio loudness, the acoustic isolation barrier 500*a* height may be less than the inner height created by the device case 100. In such an embodiment where the acoustic isolation barrier 500*a* may reduce the audio loudness, the material of the acoustic isolation barrier 500*a* may enable at least a portion of the audio from the left side of the device case 100 to the right side of the device case 100 even if the acoustic isolation barrier 500*a* forms a complete seal across the device case 100 width and height.

The acoustic isolation barrier 500 (e.g., acoustic isolation barrier 500*a*) may prevent all audio from traveling from the left side of the device case 100 to the right side of the device case 100. For example, the acoustic isolation barrier 500*a* may form a complete seal across the device case 100 length and height, and the material and/or material width of the acoustic isolation barrier 500*a* does not enable any audio to travel through the acoustic isolation barrier 500*a*.

The acoustic isolation barrier 500 may completely separate a first space and a second space in the device case 100 from one another. For example, the acoustic isolation barrier 500*a* may cause a left space to be completely separate from a right space. The acoustic isolation barrier 500 may partially separate a first space and a second space in the device case 100 from one another. For example, the acoustic isolation barrier 500*b* may cause a left space to be partially separated from a right space. The partial separation may prevent a portion of audio from traveling from one space to another. In an example, the acoustic isolation barrier 500 may prevent more than half of the audio from propagating from one side of the acoustic isolation barrier 500 to the other.

In certain embodiments, the acoustic isolation barrier 500 is shaped such that audio is directed in a particular direction. For example, the acoustic isolation barrier 500*c* may be shaped such that audio from an audio interface of a device 104 installed in the device case 100 at a location corresponding to an opening of the device case 100 (e.g., an opening in the front cover) is caused to be directed out of the device case 100. The audio may be directed out of the device case 100 in general (e.g., out of the back cover 202, out of the front cover) or may be directed such that the audio will propagate towards a probable position of a user of the device 104 (e.g., out of the front cover).

Figure 6:
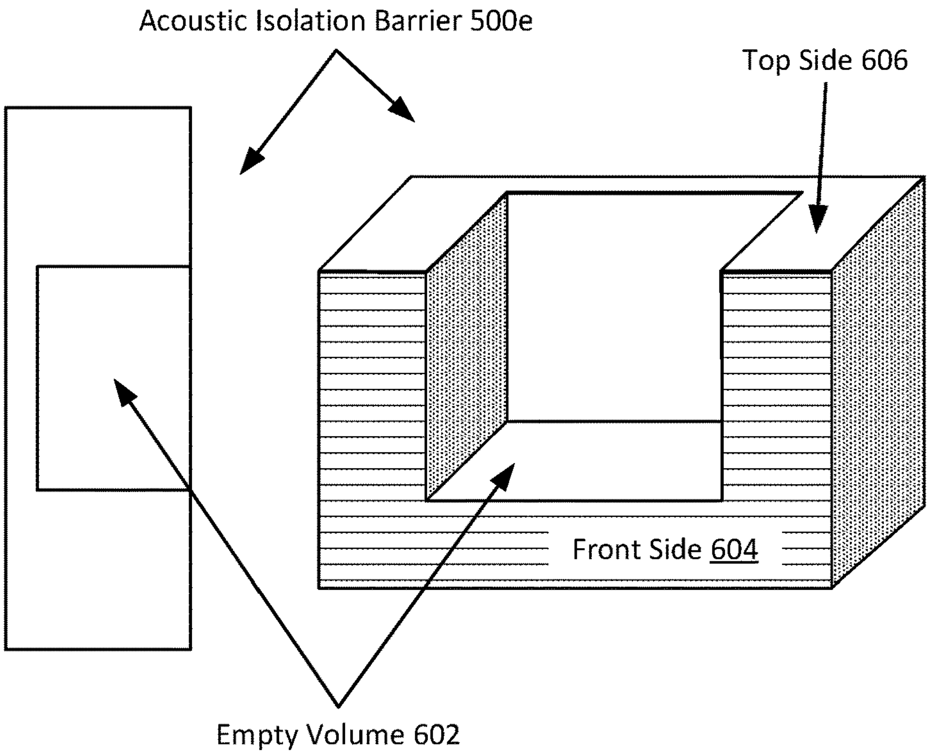
FIG. 6 illustrates multiple perspectives of an acoustic isolation barrier, according to embodiments of the present disclosure.
Figure 6:
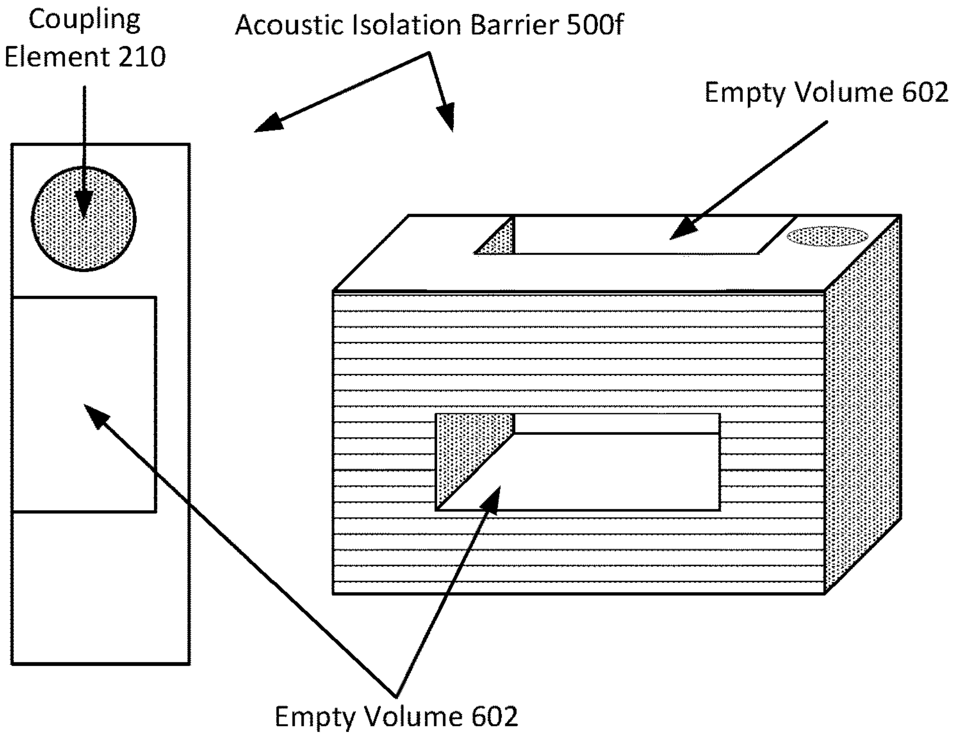

FIG. 6 illustrates multiple perspectives of two acoustic isolation barriers 500, according to embodiments of the present disclosure.

The acoustic isolation barriers 500*e* and acoustic isolation barrier 500*f* may be configured to prevent (partially or completely) audio from propagating from one space included in a device case 100 (e.g., device case 100) to a second different space included in the device case 100.

The acoustic isolation barrier 500*e* and the acoustic isolation barrier 500*f* may include an empty volume 502 that is used to cause audio to travel in a certain direction. For example, the acoustic isolation barrier 500*e* may receive audio from the front side 604 of the acoustic isolation barrier 500*e*. The audio may be generated and output by an audio interface of a device (e.g., the device 104 discussed above) located within proximity of the acoustic isolation barrier 500*e*. The audio may be directed to travel toward the top side 606 of the acoustic isolation barrier 500*e* and out of an opening corresponding to the location of the acoustic isolation barrier 500*e* and/or audio interface. As such, the acoustic isolation barrier 500 may be used to direct audio from inside of the device case to the outside of the device 104 case (or vice versa) and may prevent (e.g., partially or completely) the audio from entering one or more spaces inside the device case 100.

The acoustic isolation barrier 500 material property and/or thickness/width may prevent audio from traveling through the acoustic isolation barrier 500 and therefore prevent the audio from propagating to another space in a device case 100.

The acoustic isolation barrier 500 thickness/width, height, and/or length may vary based on whether the acoustic isolation barrier 500 is configured to partially or completely prevent sound from traveling from one side of the acoustic isolation barrier 500 to another side of the acoustic isolation barrier 500. The acoustic isolation barrier 500 width, height, and/or length may be uniform or non-uniform. In certain embodiments the acoustic isolation barrier 500 height, width and/or length may be between 2 inches and 8 inches. In certain embodiments, the height, width, and length of the acoustic isolation barrier 500 may be different from one or more of the other the acoustic isolation barrier 500 height, width, or length.

Figure 7:
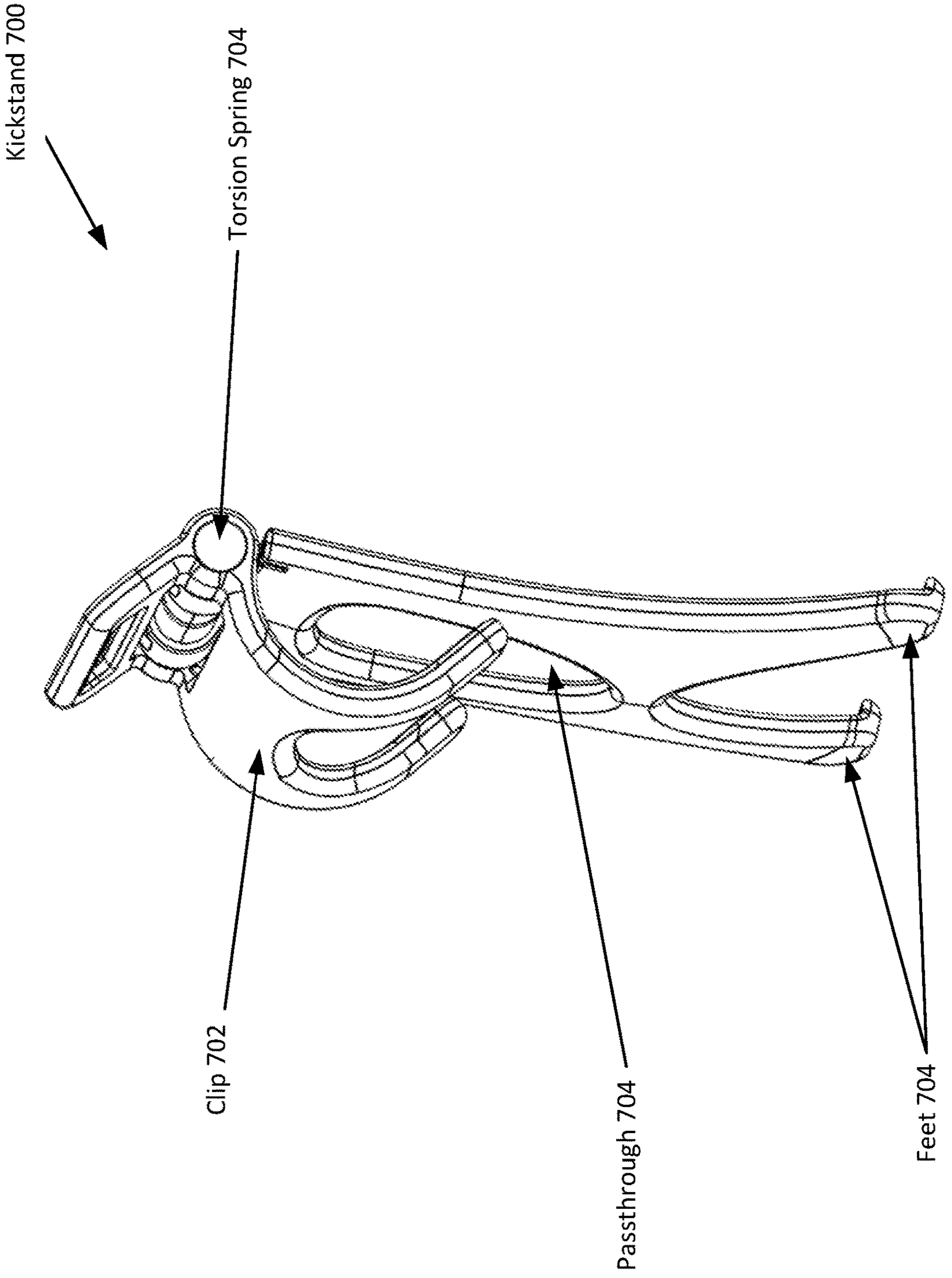
FIG. 7 illustrates a kickstand, according to embodiments of the present disclosure.

FIG. 7 illustrates a kickstand 700, according to embodiments of the present disclosure.

The kickstand 700 may include a clip 702, a torsion spring 704, a passthrough 704, and one or more feet 704. The kickstand 700 may be coupled with the device case 100 (e.g., to the outside of the back cover 202). The kickstand 700 may enable the device case 100 to be rested at a configurable angle, a predetermined angle, and/or be coupled with an object (e.g., a bar).

The kickstand 700 may be included in the device case 100. In certain embodiments, the kickstand 700 may be detachably coupled to the device case 100. For example, the kickstand 700 may be capable of being coupled to and decoupled from the device case 100 by a user of the device case 100. The kickstand 700 may attach to the device case 100 using a suction cup, a magnet, one or more coupling elements 210, or another technique for attaching the components together.

The clip 702 may be shaped to fit around (e.g., partially or completely) an object having the same shape, a complementary shape, or another shape. For example, the clip 702 may have a main body and one or more elements (e.g., arms) extending outwardly from the body. The body and/or element(s) may have a rounded shape such that the clip 702 can be attached to a round object such as a round bar (e.g., a circular bed rail bar of a hospital bed). In other examples, the body and/or elements can have other shapes, such a rectangular shape, a triangular shape, etc. Furthermore, one or more of the elements can be retractable, foldable, and/or rotatable relative to the body. In the various example, the body and/or the elements are shaped and arranged such that the clip 702 is capable of attaching to one or more object shapes (e.g., cylindrical, ellipsoidal, rectangular, etc.). An example of an object to which the clip 702 can be attached is a bed rail of a hospital bed. The shape of the clip 702 arms(s) may enable the clip 702 to be attached to an object at a particular angle. For example, a clip 702 arm(s) with a shape similar to the object surface it will be in contact with may allow the clip 702 arms(s) to better stay in place on the object surface it is placed against due to increased friction and/or forces exerted between the object surface(s) and the clip 702 surface(s). In the illustrated example, the clip 702 includes two arms, but the clip 702 may include one or more arms or other types of elements extending from the body. The one or more arms or other elements may be configured to open to a predetermined position and may be configured to exert a closing force. When in a closed position, the one or more arms and/or other elements may or may not be in contact with the kickstand 700, device case 100, or other component. For example, when closed, the clip 702 arms may close to the point where they touch the kickstand 700. In an example, when closed, the clip 702 arms may close to the point where they do not touch the kickstand 700.

The clip 702 may include material that enables the clip 702 to stay in place. For example, the clip 702 arm(s) and/or other clip 702 components may include rubber material to help the clip 702 have a slip-reducing grip on an object. The clip 702 may include material to help prevent damage to the object the clip 702 is attached to. For example, the clip 702 may include a soft material (e.g., cloth, microfiber, Thermoplastic Polyurethane (TPU), rubber) to prevent the clip 702 from causing scratching to the surface of the object it is wrapped around.

The capability of the clip 702 to attach to an object may be effected by the clamping force capable of being exerted by the clip 702. The clamping force capable of being exerted by the clip 702 may be effected by the torsion spring 704.

The torsion spring 704 may enable the clip 702 to have a predetermined amount of closing force. The closing force exerted by the torsion spring 704 and the clip 702 may cause the clip 702 to stay attached to an object. The torsion spring 704 may determine the amount of force to be used to cause the clip 702 to open (e.g., such that the clip 702 can be attached to an object). One having ordinary skill in the art with the benefit of the present disclosure would recognize other techniques that may be used to cause the clip 702 to open and close.

In certain embodiments, the clip 702 may remain closed not because of a torsion spring 704, but because of one or more coupling elements included in the clip 702. For example, the clip 702 may include magnets capable of causing the clip 702 to remain shut unless a requisite amount of force is exerted to force the magnets to decouple.

The passthrough 704 may be configured to allow one or more components to pass through the passthrough 704. For example, a cord may be passed through the passthrough 704 so that the cord can be coupled to the device case 100 and/or device 104. The passthrough 704 may reduce the weight of the kickstand 700 so that a device case 100 that the kickstand 700 is attached to is light enough for a user to carry comfortably. The passthrough 704 may reduce the amount of material and energy used in the manufacturing of the kickstand 700.

The one or more feet 704 may enable the kickstand 700 to rest on a surface. The feet 704 of the kickstand 700 may enable a device case 100 attached to the kickstand 700 to remain at a particular position and/or angle. For example, the feet 704 of the kickstand 700 may be extended by a certain first angle or distance from the device case 100 and cause the device 104 case to rest at a second angle corresponding to the first angle. The feet 704 may include material such as rubber, metal, leather, and/or plastic. The material included in the feet 704 may enable the feet 704 to remain positioned with respect to a surface the feet 704 are in contact with (e.g., a table, a user's lap).

Figure 8:
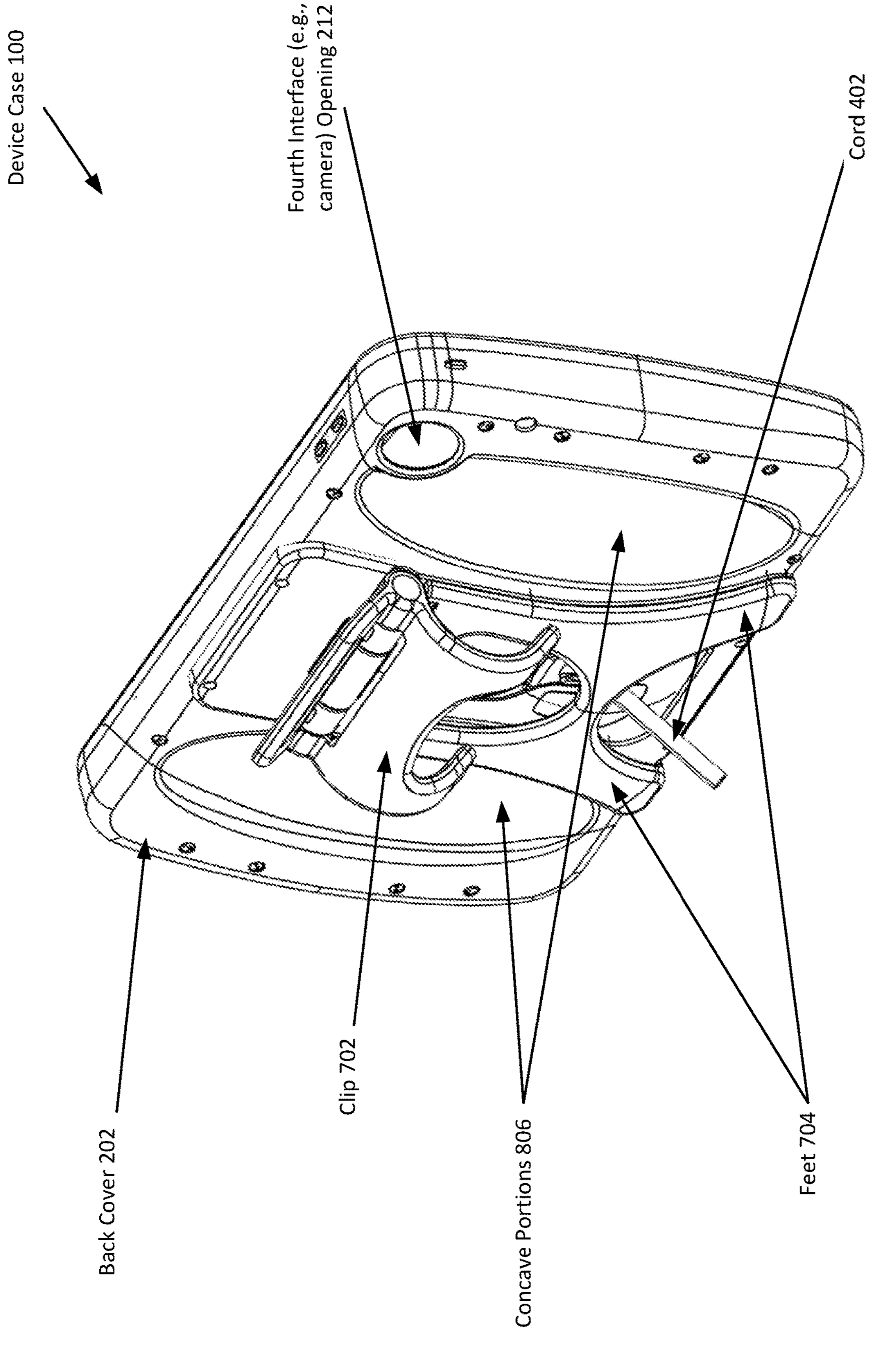
FIG. 8 illustrates a kickstand coupled to a device cover, according to embodiments of the present disclosure.

FIG. 8 illustrates a kickstand 700 coupled to a device case 100, according to embodiments of the present disclosure. The device case 100 may be the same device case 100 as illustrated in FIG. 1, but may be viewed from a different viewpoint.

The illustrated kickstand 700 is attached to the back cover 202 of the device case 100 and is in a closed position. In an open position, the kickstand 700 may extend at an angle relative to the back cover 202 of the device case 100. The kickstand 700 may extend to predetermined angles or be capable of resting at any angle defined by a user and within the angle of rotation of the kickstand 700.

The device case 100 may include a back cover 202, a front cover (which may or may not be seen from the viewpoint illustrated in FIG. 8), a clip 702, feet 704, a cord 402, a fourth interface opening 212, and one or more concave portions 806.

The clip 702 and the feet 704 may be the clip 702 and the feet 704 as described with respect to FIG. 7.

The cord 402 may be the cord 402 as described with respect to FIG. 4. The cord 402 may enter the device case 100 through an access channel of the back cover 202 as described above. The cord 402 may be capable of being fed through a passthrough of the clip 702, between the feet 704 of the clip 702, and/or outside of the feet 704. In certain embodiments, the access channel may cause the cord 402 to enter the back cover 202 at a particular angle such that the cord 402 is angled between the feet 704 of the kickstand 700.

The one or more concave portions 806 of the case may be device risers 302. The one or more concave portions 806 enable the device case 100 to be more easily handled by a user and may include material that assists the user in obtaining a grip of the device case 100. For example, the concave portions 806 may be configured such that the fingers of a user rest inside of the concave portions 806 when a user's palm is located near the edges of the device case 100 and near the concave portions 806.

In certain embodiments, the device case 100 may be configured to be coupled with a hospital log, paper, folder, and/or clip board, etc. The clip 702 of the device case 100 may be capable of exerting force normal to a surface of the device case 100 (e.g., the back cover 202 of the device case 100). The force normal to the surface of the device case 100 may enable the clip 702 to cause an object such as the hospital log, the folder, the paper to be pressed against the device case 100. The force may be great enough to hold the object in place against the device case 100.

In certain embodiments, one or more components of the device case 100 are molded using a multi-step injection molding process. One or more components of the device case 100 may be manufactured using an over molding process, an injection molding process, vacuum casting, thermoforming, blow molding, compression molding, and/or a subtractive process (e.g., computer numerical control (CNC) machining).

Figure 9:
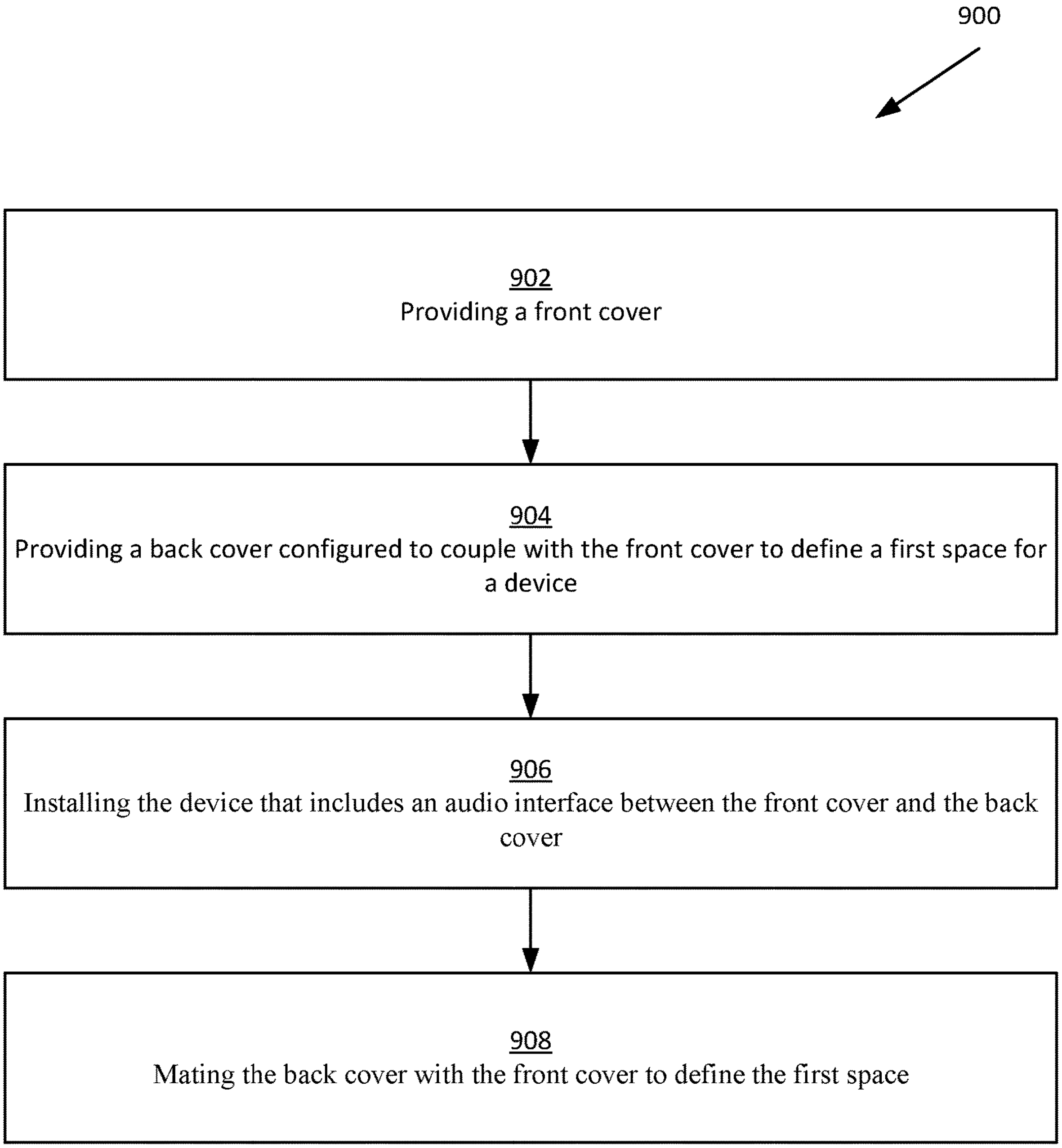
FIG. 9 illustrates a method of installing a device in a device case, according to embodiments of the present disclosure.

FIG. 9 illustrates a method 900 of installing a device (e.g., device 104) in a device case (e.g., device case 100), according to embodiments of the present disclosure.

At 902, a front cover may be provided. The front cover may include a set of perforations through the front cover.

At 904, a back cover may be provided. The back cover may be configured to couple with the front cover. When the back cover is coupled with the front cover, the first space may be defined. The back cover and the front cover may encase the device when the device is installed in the first space. An acoustic isolation barrier may be included in at least one of the back cover or the front cover. The acoustic isolation barrier may protrude from at least one of the back cover or the front cover and extend to at least one of the device or the other one of the back cover or the front cover. The acoustic isolation barrier may define a second space.

At 906, the device may be installed. The device may include at least one audio interface (e.g., a microphone and/or a speaker). The device may be installed between the front cover and the back cover. The device may be installed at a location such that an audio interface of the device corresponds to the set of perforations of the front cover. The device may be installed at a location such that an audio interface of the device is located in the second space defined by the at least one acoustic isolation barrier.

In certain embodiments, when the device is installed, the installing includes placing the device against one or more device risers. The device risers may be configured to raise the device toward the front cover and away from the back cover. In certain embodiments, an acoustic isolation barrier may prevent audio from traveling from one space to another (partially or completely) and may include a device riser.

In certain embodiments, the device is installed into a device tray (e.g., described above). The device tray may then be installed into the device case like a device would otherwise be installed. For example, the device may be installed into a device tray and the device tray may be placed against one or more device risers included in the back cover.

At 908, the back cover may be mated with the front cover. After the front cover has been mated with the back cover, the first space may be defined.

In certain embodiments, the acoustic isolation barrier includes at least one coupling element and the coupling element may be used to mate the back cover with the front cover. For example, if the acoustic isolation barrier is included in the back cover, a coupling element included in the acoustic isolation barrier may be used to mate the front cover to the back cover.

In certain embodiments, a kickstand may be provided and the kickstand may be coupled with the device case. The kickstand may be coupled with the device case such that the kickstand opens in a direction relative to one of the sides of the device case. For example, the kickstand may be coupled with the device case such that when the kickstand is open, the device is in a portrait orientation rather than a landscape orientation, or vice versa.

The method presented in method 900, and the other FIGS. and described herein are intended to be illustrative and non-limiting. Although method 900 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in method 900 may include a greater number or a lesser number of steps than those depicted in method 900.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase “at least one of X, Y, or Z,” unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A device case comprising:

a first portion;

a second portion opposite of the first portion, the first portion and the second portion defining a first space for a device such that the device case encases the device when the device is installed in the first space;

a set of perforations through the device case and corresponding to a location of an audio interface of the device in the first space, the audio interface including at least one of a microphone or a speaker; and an acoustic isolation barrier positioned between the first portion and the second portion, the acoustic isolation barrier defining a second space such that the audio interface is located in the second space when the device is installed in the first space, wherein the acoustic isolation barrier includes a material that restricts propagation of audio from the audio interface to the second space when the device is installed in the first space.

2. The device case of claim 1, wherein the acoustic isolation barrier corresponds to the location of the set of perforations.

3. The device case of claim 1, further comprising:

a liquid barrier included in the device case within a predefined distance to the set of perforations.

4. The device case of claim 1, further comprising:

one or more device risers configured to raise the device toward the first portion or the second portion and away from the other of: (i) the first portion and (i) the second portion, wherein at least one of the one or more device risers includes the acoustic isolation barrier.

5. The device case of claim 1, wherein the acoustic isolation barrier is configured to couple the first portion with the second portion.

6. The device case of claim 1, further comprising:

a coupling element, wherein the acoustic isolation barrier includes at least one of: (i) a receiver or (ii) a male piece for the coupling element.

7. The device case of claim 1, wherein the acoustic isolation barrier comprises at least one of: (i) a foam material, (ii) a plastic material, (iii) a rubber material, or (iv) a fabric material.

8. The device case of claim 1, further comprising:

a channel for housing one or more components, wherein the acoustic isolation barrier includes the channel.

9. The device case of claim 8, wherein the channel further comprises a first end and a second end, wherein the first end is exposed to a first side of the device case and the second end is exposed to a second side of the device case, and wherein the first side is between the first portion and the second portion and the second side is exposed to an outside of the device case.

10. The device case of claim 8, wherein the one or more components is at least one of: a cable, a printed circuit board (PCB), a magnet, an RFID tag, a battery bank, or a sensor.

11. The device case of claim 1, wherein the acoustic isolation barrier comprises antimicrobial additives.

12. The device case of claim 1, further comprising:

a kickstand coupled to the device case and including a first perforation for a cable that feeds through a second perforation of the device case.

13. The device case of claim 1, further comprising:

a clip coupled to the device case and including cylindrical arms and a torsion spring configuring the cylindrical arms of the clip to wrap around an object.

14. The device case of claim 1, wherein the microphone is located in the second space when the device is installed in the first space and further comprising:

a second acoustic isolation barrier positioned between the first portion and the second portion and that is in contact with at least one of: (i) the device, (ii) the first portion, or (iii) the second portion, the second acoustic isolation barrier defining a third space such that the microphone is located in the third space when the device is installed in the first space.

15. The device case of claim 1, further comprising:

a second set of perforations through the second portion and corresponding to the location of the audio interface in the first space.

16. The device case of claim 1, further comprising:

one or more membranes that are water impermeable and acoustically permeable.

17. A system comprising:

a device; and a device case, the device case comprising:

a first portion;

a second portion opposite of the first portion, the first portion and the second portion defining a first space for the device, wherein the device is installed in the first space such that the device case covers the device;

a set of perforations through the device case and corresponding to a location of an audio interface of the device in the first space, the audio interface including at least one of a microphone or a speaker; and an acoustic isolation barrier positioned between the first portion and the second portion, the acoustic isolation barrier defining a second space, wherein the audio interface is located in the second space, wherein the acoustic isolation barrier includes a material that restricts propagation of audio from the audio interface to the second space when the device is installed in the first space.

18. The system of claim 17, wherein the device case further comprises:

a request button (i) located on at least one of: (a) the device case or (b) the device, or (ii) located in at least one of: (a) the device case or (b) the device; and a circuit that processes input received from the request button.

19. The system of claim 17, wherein the device case further comprises:

a power charger that magnetically charges the device.

20. The system of claim 17, wherein the device case further comprises: a second audio interface coupled with the device.

21. The system of claim 17, further comprising:

a cable providing at least one of: (i) power or (ii) data to at least one of the (iii) the device or (iv) the device case, the cable including a second audio interface.

22. The system of claim 17, wherein the device case further comprises:

a first magnetic connector configured to connect to a second magnetic connector of (i) a cable and (ii) to an interface with the device, the cable configured to couple the device to a hospital system.

23. The system of claim 17, further comprising:

a cable providing at least one of: (i) power or (ii) data to at least one of the (iii) the device or (iv) the device case, the cable configured to be detachably coupleable to at least one of: (v) the device case, vi) the device, or (vii) a hospital system.

24. The system of claim 17, wherein the device case further comprises:

a tray configured to be coupled with at least one of (i) the first portion or (ii) the second portion, and configured to be coupled with the device of a first size and a second device of a second size that is different than the first size.

25. A method comprising:

providing a device case including a set of perforations through the device case, a first portion, and a second portion opposite of the first portion configured to define a first space for a device such that the device case encases the device when the device is installed in the first space, wherein the device case includes an acoustic isolation barrier between the first portion and the second portion, the acoustic isolation barrier defining a second space; and installing the device that includes an audio interface between the first portion and the second portion at a location such that the audio interface corresponds to the set of perforations and is located in the second space, wherein the audio interface includes at least one of a microphone or a speaker, wherein the acoustic isolation barrier includes a material that restricts propagation of audio from the audio interface to the second space when the device is installed in the first space.

26. The method of claim 25, wherein installing the device further comprises:

placing the device against one or more device risers configured to raise the device toward the first portion and away from the second portion, wherein at least one of the one or more device risers includes the acoustic isolation barrier.

27. The method of claim 25, wherein the method further comprises:

mating the first portion with the second portion to define the first space.

* * * * *